(12) United States Patent
Frederickson et al.

(10) Patent No.: US 7,904,931 B2
(45) Date of Patent: Mar. 8, 2011

(54) EFFICIENT SOFTWARE BITSTREAM RATE GENERATOR FOR VIDEO SERVER

(75) Inventors: James Frederickson, Princeton, NJ (US); Clement G. Taylor, Watertown, MA (US)

(73) Assignee: Cox Communications, Inc., Atlanta, GA (US)

( * ) Notice: Subject to any disclaimer, the term of this patent is extended or adjusted under 35 U.S.C. 154(b) by 1683 days.

(21) Appl. No.: 10/238,398

(22) Filed: Sep. 10, 2002
(Under 37 CFR 1.47)

(65) Prior Publication Data
US 2003/0115609 A1    Jun. 19, 2003

(51) Int. Cl.
*H04N 7/173* (2006.01)
(52) U.S. Cl. .................... 725/93; 370/429; 370/395.4
(58) Field of Classification Search ............... 725/86, 725/93, 97; 370/429, 395.4
See application file for complete search history.

(56) References Cited

U.S. PATENT DOCUMENTS

| | | | | |
|---|---|---|---|---|
| 5,533,020 A * | 7/1996 | Byrn et al. | ................ | 370/395.4 |
| 5,592,612 A | 1/1997 | Birk | ........................ | 395/182.04 |
| 5,787,482 A * | 7/1998 | Chen et al. | ..................... | 711/158 |
| 6,028,843 A * | 2/2000 | Delp et al. | ........................ | 370/235 |
| 6,115,365 A * | 9/2000 | Newberg et al. | ............... | 370/312 |
| 6,205,150 B1 * | 3/2001 | Ruszczyk | ..................... | 370/412 |
| 6,269,079 B1 * | 7/2001 | Marin et al. | .................. | 370/230 |
| 6,374,336 B1 * | 4/2002 | Peters et al. | .................. | 711/167 |
| 6,378,036 B2 | 4/2002 | Lerman et al. | ................ | 711/112 |
| 6,385,673 B1 * | 5/2002 | DeMoney | ........................ | 710/60 |
| 6,430,181 B1 * | 8/2002 | Tuckey | .......................... | 370/386 |
| 6,502,139 B1 * | 12/2002 | Birk et al. | ..................... | 709/233 |
| 6,791,992 B1 * | 9/2004 | Yun et al. | ....................... | 370/415 |
| 6,801,943 B1 * | 10/2004 | Pavan et al. | .................... | 709/226 |
| 6,882,625 B2 * | 4/2005 | Le et al. | ....................... | 370/238 |
| 6,954,469 B1 * | 10/2005 | Dygert | ........................... | 370/477 |
| 7,140,016 B2 * | 11/2006 | Milovanovic et al. | ........ | 718/100 |
| 2002/0075804 A1 * | 6/2002 | Le et al. | .......................... | 370/235 |
| 2003/0167454 A1 * | 9/2003 | Iordanov et al. | .............. | 717/104 |
| 2004/0170198 A1 * | 9/2004 | Meggers et al. | .............. | 370/514 |
| 2004/0205166 A1 * | 10/2004 | DeMoney | ...................... | 709/219 |
| 2010/0118819 A1 * | 5/2010 | Welin | ............................ | 370/329 |

* cited by examiner

*Primary Examiner* — Andrew Y Koenig
*Assistant Examiner* — Ricky Chin
(74) *Attorney, Agent, or Firm* — Merchant & Gould (57) ABSTRACT

An apparatus and a method for constraining the delivery rate of a plurality of bitstreams, such as MPEG bitstreams using a single software process.

13 Claims, 5 Drawing Sheets

EFFICIENT SOFTWARE BITSTREAM RATE GENERATOR FOR VIDEO SERVER

BACKGROUND OF THE INVENTION

1. Field of the Invention

The invention relates to information distribution systems. More particularly, the invention relates to an apparatus and a method for a software rate generator for serving bitstreams to multiple users.

2. Description of the Related Art

In many communication systems the data to be transmitted is compressed so that the available bandwidth is used more efficiently. For example, the moving pictures expert group (MPEG) has promulgated several standards relating to digital data delivery systems. The first, known as MPEG-1 refers to ISO/IEC standards 11172 and is incorporated herein by reference in its entirety. The second, known as MPEG-2, refers to ISO/IEC standards 13818 and is incorporated herein by reference in its entirety. Additional MPEG standards comprise MPEG-4 and MPEG-7, both of which are incorporated herein by reference in their respective entireties. Additionally, the European digital video broadcasting (DVB) standard and other related standards are also employed to transmit compressed data.

In information distribution applications, such as video on demand (VOD) and other applications in which a plurality of subscribers receive respective information stream (as close) each of the bitstreams or information streams provided to the respective subscribers may have associated with it a unique bit rate. Within the context of the above-referenced standards, it is typically necessary to tightly constrain the bitstream delivery rate of the various information streams such that decoder buffer underflow and/or overflow is avoided.

Presently, servers are architected to constrain various parameters of multiple bitstreams delivered to respective subscribers using custom hardware and/or parallel processing techniques. However, such custom hardware and/or parallel processing techniques are relatively complex and, therefore, costly.

SUMMARY OF THE INVENTION

The invention overcomes the disadvantages of the prior art by providing an apparatus and a method for constraining the delivery rate of a plurality of bitstreams, such as MPEG bitstreams using a single software process.

A method according to one embodiment of the invention comprises retrieving, from a priority queue, a stream deadline element including a respective stream deadline key and stream identifier; and in the case of the stream deadline key representing a time later than a current time, transmitting at least one packet associated with the identified stream

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF AN EMBODIMENT

The invention is described within the context of a video on demand (VOD) system. Such a system is disclosed in U.S. Pat. No. 6,253,375, issued Jun. 26, 2001, and herein incorporated by reference in its entirety. The video information supplied by the VOD system is typically formatted in accordance with the MPEG (Moving Pictures Experts Group) standards, such as ISO/IEC 11172 (MPEG-1) and ISO/IEC 13818 (MPEG-2), both of which are incorporated by reference in their entireties. However, it will be appreciated by those skilled in the art that the teachings of this disclosure may be readily applied to other non-VOD systems, and to systems utilizing other standards for conveying information to a plurality of users. Such other standards include the American Television Standards Committee (ATSC) and European Digital Video Broadcasting (DVB) digital television and communication related standards.

The above overcomes the disadvantages of the prior art by providing a rate generator and a concomitant method for generating many possible frequencies in a video on demand (VOD) system. Specifically, the rate generator comprises a plurality of parallel oscillator modules. Each oscillator module comprises a phase accumulator, a phase increment register and an adder. The adder is coupled to the phase accumulator and the phase increment register, where the register is coupled to a first input of the adder while the accumulator is coupled to the output of the adder and a second input of the adder. As such, the register contents sets the frequency for the oscillator, the accumulator accumulates the adder output (phase accumulation) and feeds the accumulated phase into the second input of the adder. The adder periodically adds a phase increment value, stored within the phase increment register, to the current value in the phase accumulator. When the sum in the phase accumulator reaches a pre-determined value, e.g., a roll over occurs, the adder generates a pulse at the carry out port having a frequency that is dependent on the phase increment value and the sampling frequency. As such, the carry out signal from the adder forms a digital clock output of the oscillator.

To form a plurality of clock signals having different and unrelated frequencies, the oscillator components (adder, register and accumulator) are time shared such that for each instant of time, the oscillator is computing a different output frequency based upon a different set of register and accumulator values. The values used in each individual oscillator are stored in a dual port memory for rapid and repeated access by the module.

Figure 4:
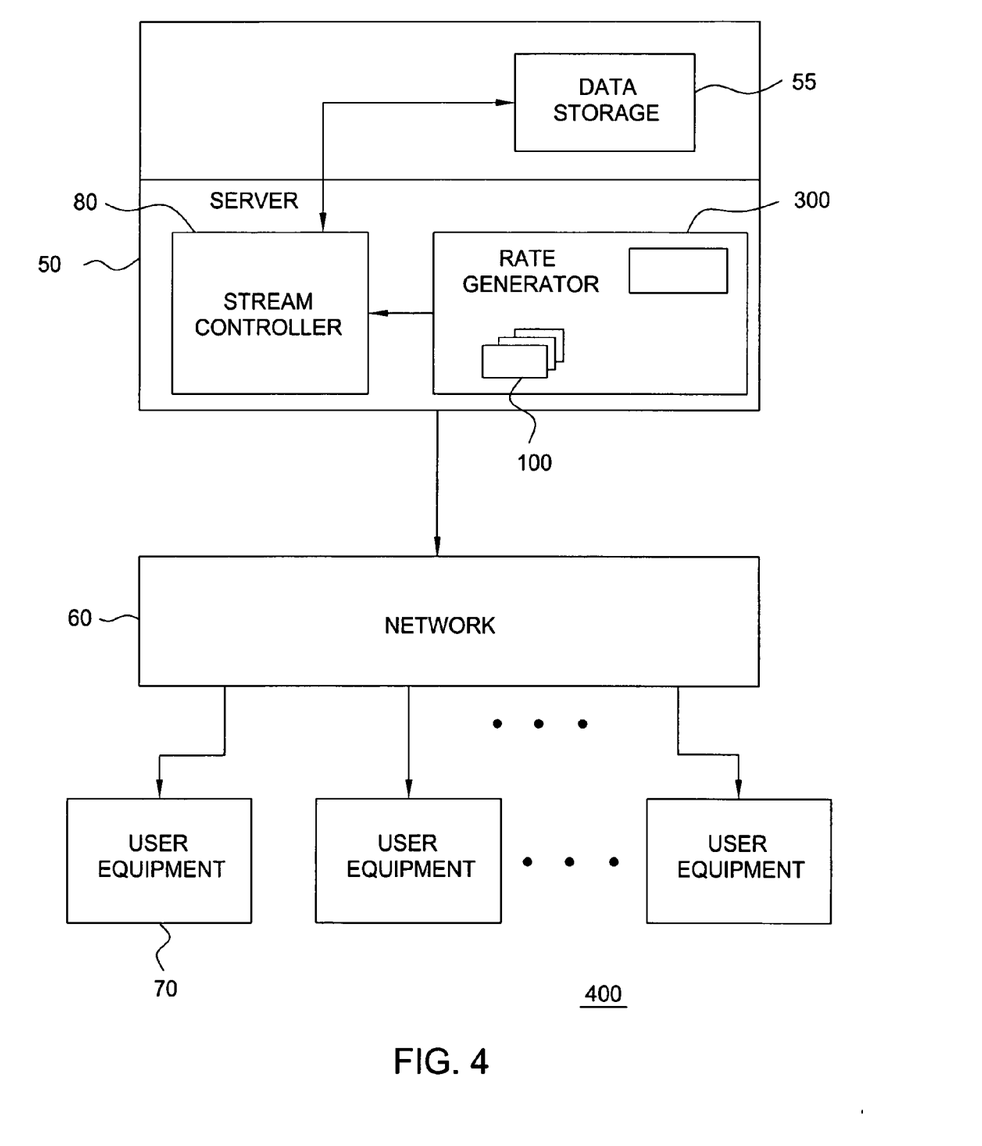
FIG. 4 depicts a top-level block diagram of a video on demand (VOD) system.

FIG. 4 depicts a top-level block diagram of the VOD system that provides or serves video content at different constant bit rates, i.e., Multiple Constant Bit Rate (MCBR). This capability of serving or providing MCBR content enables the VOD system 400 to provide a greater variety of video content with different resolutions or compression rates. As such, the VOD system 400 is not limited to serving video content of a single resolution or video quality.

The VOD system 400 comprises a server 50, a network 60 and user equipment 70. The server 50 transmits video content to a plurality of user equipment 70 via the network 60. More specifically, the server 50 comprises data storage 55, a stream controller 80 and a rate generator 300. The rate generator 300 produces a plurality of clock signals. These clock signals are used by the stream controller to access data streams from the data storage 55 and combine multiple constant bit rate (MCBR) data into a transport stream. The stream controller 80 provides the data stream to the network 60 and user equipment 70.

The VOD system 400 provides a variety of video content at "arbitrary" bit rates that are not necessarily multiples of a default frequency. As such, the inventive concept is embodied in the generation of clock signals at different rates that are arbitrarily related, i.e. not related to each other by a default or base frequency. These clock signals facilitate retrieval and processing of the MCBR data into a transport stream. The multiple frequency rate generator allows the stream controller 80 to provide MCBR video content to a plurality of end users at arbitrarily related rates.

Figure 3:
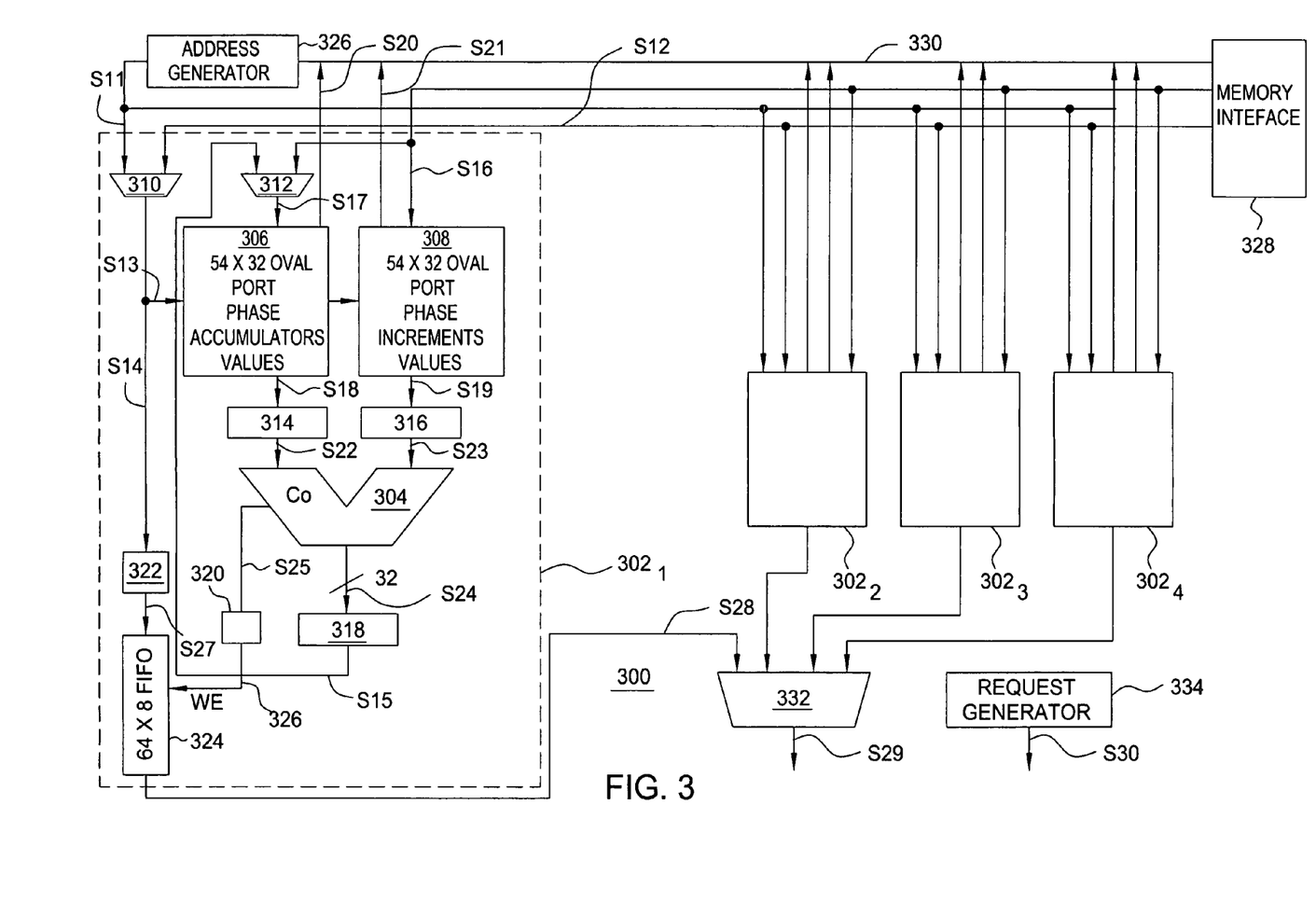
FIG. 3 depicts a block diagram of an embodiment of the rate generator as determined using the routine depicted in FIG. 2.

More specifically, the rate generator 300 comprises a plurality of oscillators 100 to provide clock pulses required for generating a transport stream comprising MCBR data. Theoretically, each end user could request a different bit rate stream such that, one oscillator 100 is required for each end user. To facilitate creating a plurality of clock signals without a plurality of clock circuits, a rate generator 300 comprises a small number of oscillator component circuits and uses the oscillator components in a sequential, time-shared or time division multiplexed (TDM) manner. In this manner, very few physical components can be used to produce a plurality of clock signals, i.e., the rate controller contains a plurality of virtual oscillators.

Figure 1:
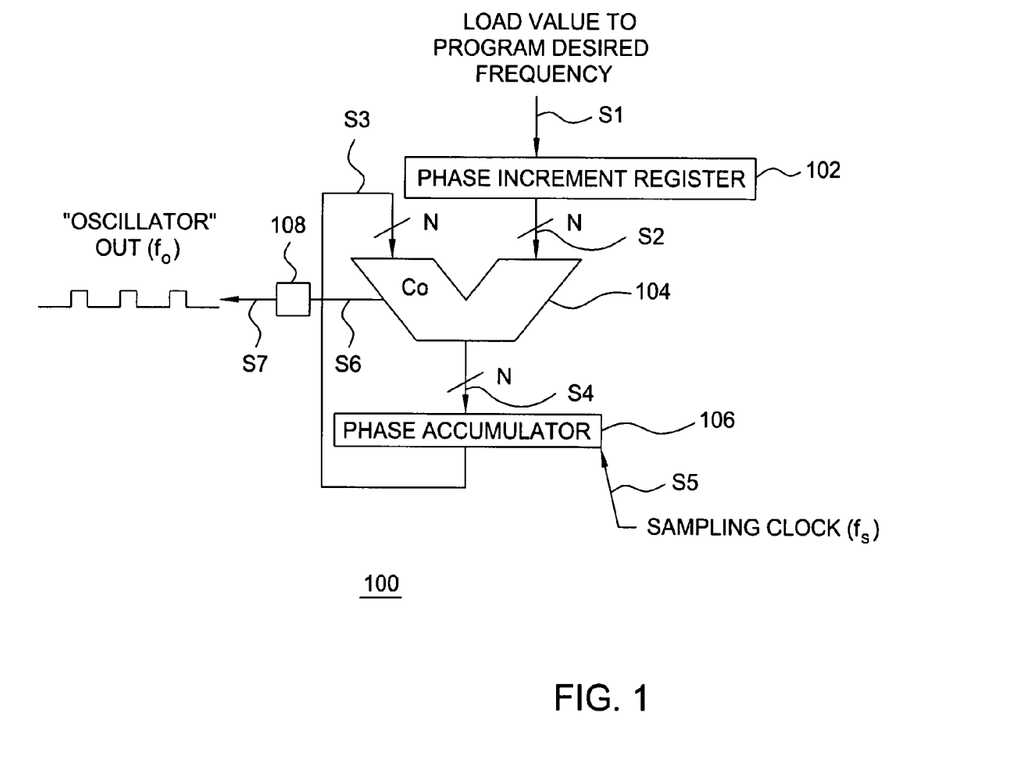
FIG. 1 depicts a block diagram of an oscillator.

FIG. 1 depicts a block diagram of an oscillator 100 for controlling data output in the VOD system 400 of FIG. 4. The oscillator 100 of FIG. 1 generates pulses at particular frequencies or time intervals using a direct digital synthesis (DDS) technique. The oscillator 100 comprises a phase increment register 102, a phase adder 104, and a phase accumulator 106. The oscillator 100 may also include a register 108 at the carry out (Co) port of the phase adder 106.

The oscillator 100 receives an arbitrary value (k) and generates a pulse at an output frequency ($f_o$) that is related to the value k by the equation:

$$f_o = \frac{k \times f_s}{2^N} = \text{where:}$$

k=phase increment (an integer value)
$f_s$=sampling clock frequency
N=number of accumulator bits The output frequency $f_o$ is defined in terms of a resolution. The resolution is the lowest possible frequency that the oscillator 100 may generate. As such, the resolution is equal to the output frequency when k=1:

$$\text{resolution} = \frac{f_s}{2^N}$$

such that $f_o$=k×resolution

In operation, the phase increment register 102 receives from memory a phase increment value k via signal path S1. Phase increment k is generally an integer between 1 and $2^{N-1}$, where N is the number of accumulator bits (i.e., the number of bits capable of being stored in the phase accumulator 106). As such, the phase increment register 102 is typically an N-bit register that receives and stores an N-bit binary number. The phase increment register 102 operates as a buffer and provides the preloaded phase increment value k when needed. The output of the phase increment register 102 is coupled to the phase adder 104 via signal path S2.

The phase adder 104 receives the phase increment k from the phase increment register 102 via signal path S2 and the output from the phase accumulator 106 via signal path S3. The phase adder 104 adds the phase increment and phase accumulator outputs, which are both N-bit binary numbers, and couples the sum to the phase accumulator 106 via signal path S4.

The phase accumulator 106 comprises an N-bit register that receives the sum from the phase adder 104 via signal path S4 and provides this sum back to the phase adder 104 via signal path S3 during each periodic time interval, as defined by the sampling frequency $f_s$. Upon receiving a pulse from a sampling clock having a frequency $f_s$ via signal path S5 and during each frequency cycle, the phase accumulator 106 provides the updated sum back to the phase adder 104.

The phase adder 104 utilizes modulo $2^N$ addition. As such, when the sum of the phase adder 104 exceeds $2^N-1$ (there are $2^N$ binary numbers ranging from 0 to $2^N-1$), the phase adder 104 "rolls over" through zero and starts again. When the phase adder 104 rolls over, the phase adder 104 generates a carry out signal (denoted as Co in FIG. 1) at the carry out port, which generally comprises a pulse, via signal path S6. The phase adder 104 generates the pulse at an output frequency $f_o$ that is dependent upon the phase increment, the sampling frequency and the number of accumulator bits. As such, the oscillator 100 may generate pulses at many possible frequencies that are arbitrary related or "arbitrary," i.e. not integer multiples of one another.

The actual output frequency, $f_o$, represents an average frequency, since the modulo $2^N$ value (remainder) is often a non-zero number when the phase adder 104 rolls over. Unless k is a power of two, the remainder or value after roll over may introduce a phase jitter that increases with the value of k, since there are less samples per period or frequency cycle.

As an illustrative example, assume that phase accumulator 106 utilizes three bits (N=3) and that the phase increment is three (k=3). Also, assume that the phase accumulator 106 does not have any initial offset. In this case, the average output frequency $f_o$ is 0.375 of the sampling frequency, which means that the output pulse occurs once every 2.67 iterations of the sampling pulse. During the first two sampling cycles, the sum of the phase adder is three and six, respectively. In the third sampling cycle, the phase adder 104 rolls over with a remainder of two. Hence, the output frequency is only one third of the sampling frequency at the first roll over of the phase adder 104. However, this effect will even out with subsequent iterations of the phase adder 104.

The oscillator 100 may also include a register 108 for temporarily storing the carry out pulse from the phase adder 104. The register 108 receives the pulse from the carry out of the phase adder 104 via signal path S6 and sends this pulse via signal path S7 when needed. As the pulse is usually a single bit signal, the register 108 may comprise a single-bit register.

The invention produces a plurality of clock signals from an oscillator like the one in FIG. 1 by time-sharing the components of the oscillator. Such time-sharing of the components forms a rate generator comprising a plurality of virtual oscillators, where the implementation of the rate generator requires certain operational parameters to be fulfilled. These parameters for the rate generator can be defined using a particular method.

Figure 2:
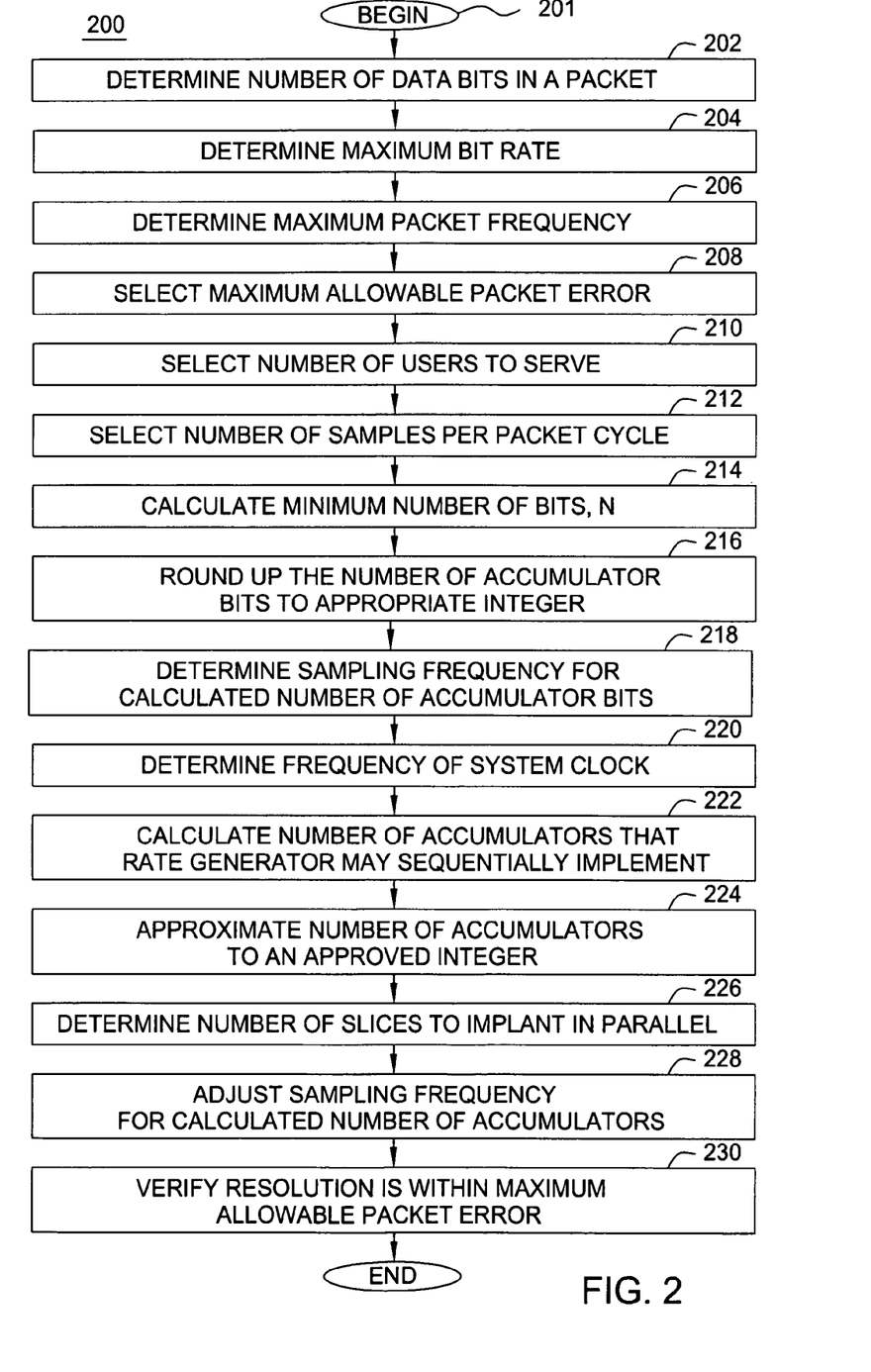
FIG. 2 depicts a flow diagram of a method for determining a rate generator that includes a plurality of the oscillators in FIG. 1.

FIG. 2 depicts a flow diagram of a method 200 for determining the operational parameters of a rate generator that includes a plurality of the virtual oscillators 100 depicted in FIG. 1. Although the following discussion will provide an illustrative example, the specific values are not intended as limiting. Other architectures are contemplated to be within the scope of the invention.

The method 200 starts at step 201 and proceeds to step 202 where the method 200 determines the number of data bits in a packet. A typical transport packet transmitted under the MPEG-2 standard comprises 188 bytes of data or (188 bytes/packet)(8 bits/byte)=1504 bits. The method 200 proceeds to step 204 for determining the maximum bit rate or maximum data rate. This value is typically 40 Mbits/sec. The method 200 proceeds to step 206 for determining the maximum packet frequency as follows:

$$\text{maximum packet frequency} = \frac{40\ M bits/\text{sec}}{1504\ \text{bits}} \approx 26596\ \text{packet/sec}$$

At step 208, the method 200 selects an allowable packet error. This packet error is an upper limit of the frequency resolution. In this example, the allowable packet error is one packet error over a two-hour interval. As the number of packets transmitted is equivalent to the packet frequency multiplied by the time period, such that $$N_{pack} = f_{pack} \times T$$

where:
  $N_{pack}$=total number of packets transmitted;
  $f_{pack}$=packet frequency in Hz; and
  T=elapsed time to transmit packets,
The number of erroneous packets transmitted is:

$$\Delta N_{pack} = \Delta f_{pack} \times T$$

where $\Delta N_{pack}$=total number of erroneous packets
  $\Delta f_{pack}$ frequency of packet error in Hz
  T=elapsed time to transmit packets.
In this case of one packet error per every two-hour interval, the required frequency associated with the allowable packet error is:

$$\Delta f\ \text{pack} = \frac{1}{T} \text{Hz} = \frac{1}{(2\ \text{hours})(3600\ \text{sec/hour})} = 0.000138\ \text{Hz}$$

At step 210, the method 200 selects a number of users that the stream controller may serve using the rate generator. In this example, the rate generator architecture may produce clock signals that facilitate processing of input/output (I/O) packet requests for 256 users. Although the rate generator may theoretically include 256 of the oscillators as shown in FIG. 1, such an approach is impractical. As such, the rate generator may sequentially implement or serially implement some of these oscillators in a time-shared or Time Division Multiplexed (TDM) manner. As such, a first oscillator is formed to produce a first clock signal, then the first oscillator is torn down and replaced with a second oscillator producing a second clock signal, which is followed by a third oscillator and so on. As such, a plurality of virtual oscillators in used to create a plurality of clock signals.

At step 212, the method 200 selects a minimum number of samples per packet cycle. In this example, 10 samples per packet cycle are appropriate to minimize the clock jitter. As the maximum packet frequency is 26596 packets/second, the minimum sampling frequency to achieve at least 10 samples per packet cycle is $$26596\ \frac{\text{packets}}{\text{sec}} \times 10\ \frac{\text{samples}}{\text{packet}} = 265960\ \text{samples/sec}$$

At step 214, the method 200 determines the number of required bits for the accumulator, N. As the resolution must be less than the frequency error, $$\text{resolution} = \frac{f_s}{2^N} \le \Delta f_{pack}$$

$$\frac{265960}{2^N} \le 0.000138$$

N≧30.8 bits

Therefore, to achieve a resolution less than the allowable packet error, the accumulator requires at least 30.8 bits. As the required number of accumulator bits is an integer, the method 200 proceeds to step 216 to determine an appropriate number of accumulator bits. This number of accumulator bits preferably an integer value that is a power of two. In this example, N≧30.8 bits, so N=32 is an appropriate number of accumulator bits.

After determining the required number of accumulator bits N, the method 200 determines the sampling frequency $f_s$ required for achieving a resolution less than the packet error. At this step 218, $$\frac{f_s}{2^N} \le 0.000138$$

$$\frac{f_s}{2^{32}} \le 0.000138$$

$f_s \le 592705$ Hz~0.6 MHz

At step 220, the method 200 selects an appropriate clock frequency. The clock frequency or cycle rate is limited to under 37 MHz, by the current dual port memory technology, typically implemented as configurable logic blocks (Clubs) in current high-end field programmable gate arrays (FPGAs). An appropriate clock frequency is 33 MHz, which is under the 37 MHz limit.

Note that the clock frequency selected at step 220 is much larger than the sampling frequency determined at step 218. As such, the rate generator architecture may sequentially implement many phase accumulators using current FPGA technology. The method 200 proceeds to step 222 for calculating the number of phase accumulators that the rate generator may sequentially implement:

$$\text{Number of sequential phase accumulators} = \frac{33\ \text{MHz}}{592705\ \text{Hz}} = 55.7 \sim 56$$

Ideally, the number of users is an integer multiple of the number of phase accumulators that may be sequentially implemented. In this example, the VOD system 400 may serve 256 users, so the preferable number of phase accumulators to sequentially implement is a power of two. As the number of phase accumulators that the rate generator may sequentially implement, i.e. 56, is not a power of two, the method 200 proceeds to step 224 to determine a more appropriate number. As 64 is a power a two that is closest to 56, the number of sequential phase accumulators is revised from 56 to 64. Note that an increase in the number of accumulators would require a lower sampling frequency, which results in a lower resolution. These are not 64 physical accumulators, but a single accumulator that is time-shared to accumulate 64 different phase values.

As the 64 sequential phase accumulators are insufficient to fully implement the 256 phase accumulators necessary to service 256 users, the method 200 proceeds to step 228 for determining the number of oscillator modules or "slices" to implement in a parallel manner. In this case, the rate generator requires four (256 divided by 64) such modules in parallel to fully implement 256 phase accumulators. As such, 4 phase accumulators are used in a time-shared manner to produce 256 different clock signals.

At step 228, the method readjusts the required sampling frequency to account for the adjusted number of serially implemented phase accumulators.

readjusted sampling frequency =
$$f'_s = \frac{\text{clock frequency}}{\text{\# accumulators}} = \frac{33 \text{ MHz}}{64} = 515625 \text{ Hz}$$

At step 230, the method verifies whether the resolution with this the readjusted frequency is within the frequency error.

$$\text{resolution} = \frac{f_s}{2^N} = \frac{515625 \text{ Hz}}{2^{32}} = 0.00012 \text{ Hz} \le 0.000138 \text{ Hz}$$

The above method 200 may also provide a rate generator architecture to accommodate 512 users. Assuming the same maximum bit rate, number of bits per packet and packet error, as the 256 user case, the method 200 may yield two options: (1) 4 parallel slices having 128 sequential phase accumulators per slice, or (2) 8 parallel slices having 64 sequential phase accumulators per slice. The first option requires a 66 MHz clock rate, which is generally impractical due to performance limitations of the on-chip RAM used to store the phase values. As such, the second option is the currently preferred solution. However, the preferred option may change as the technology improves.

As other implementations of the above method 200 are possible depending on the latest technological advances, the scope of the invention is not limited to the previous discussed examples.

FIG. 3 depicts a block diagram of an embodiment of the rate generator 300 as determined using the method 200 depicted in FIG. 2. As the rate generator 300 may sequentially implement 64 of the virtual oscillators of FIG. 1, the rate generator 300 requires four parallel oscillator modules or slices $302_1$, $302_2$, $302_3$ and $302_4$ to fully implement the 256 virtual oscillators, as required to serve 256 users in a video on demand (VOD) system. The four slices $302_1$, $302_2$, $302_3$ and $302_4$ are identical, so only one general identifier 302 is required to identify any of the slices 302.

Each slice 302 generally comprises an adder 304, a phase accumulator 306 and a phase increment register 308. The slice 302 may include other components that facilitate various embodiments of the invention. These components include an address multiplexer (MUX) 310, a phase MUX 312, pipeline registers 314, 316 and 318 at the respective outputs of the phase accumulator value storage 306 (a first dual port memory), the phase increment value storage 308 (a second dual port memory) and the adder 304, a carry out register 320, an address register 322 and a first in first out (FIFO) stack 324.

The slice 302 receives signals from an address generator 326 via signal path S11 and a memory interface 328 via signal path S12. Specifically, the address MUX 310 receives a stream identifier from the address generator 326 and an address signal from the memory interface 328. The address generator 326 operates as a controller that produces the appropriate phase and phase increment values to the adder 304 to facilitate multiple frequency clock generation. In this case, the stream identifier may comprise an 8-bit binary symbol identifying one of the 256 users. The address signal identifies the location of data within a dual port memory that is a phase accumulator value that represents the accumulated phase for an oscillator producing a clock signal for that user's data. The address signal also identifies the memory location of a phase increment value within the phase increment value storage 308. The phase accumulator value storage 306 represents 64 virtual phase accumulators and the phase increment value storage 308 represents 64 virtual phase increment registers. These individual virtual phase accumulators and virtual phase increment registers are physically implemented using timely recall of the accumulator and increment values from a dual port memory within a field programmable gate array (FPGA).

The address MUX 310 selects either the stream identifier or address signal, according to control circuitry from the memory interface 328. If the address MUX 310 accepts the stream identifier, then the address MUX 310 couples the stream identifier to the address register 322 via signal path S14. If the address MUX 310 accepts the address signal, then the address MUX 310 couples the address signal to the phase accumulator value storage 306 and the phase increment value storage 308 via signal path S13.

The phase MUX 312 receives the output from the pipeline register 318 via signal path S15, which corresponds to the output from the adder 304. This signal is the output of the adder 304 from the previous cycle as determined by the sampling frequency $f_s$. In addition, the phase MUX 312 receives the phase value from the memory interface unit 328 via signal path S16. This phase value may comprise a phase increment k or some other offset number. The phase MUX 312 couples the phase accumulator value storage 306 via signal path S17.

The phase accumulator value storage 306, illustratively, represents 64 virtual phase accumulators. The 64 virtual phase accumulators may operate sequentially in a time division multiplexed (TDM) manner, as determined in the routine 200 of FIG. 2 using a 33-MHz clock frequency. Each phase accumulator stores a 32-bit value created by adding the adder output from the previous frequency cycle to the phase increment or offset value from the phase increment value storage 308. These virtual phase accumulators operate in substantially the same manner as the phase accumulator depicted in FIG. 1. The phase accumulator value storage 306 couples the sum to the pipeline register 314 via signal path S18.

The phase increment value storage 308 similarly represents 64 virtual phase increment registers. Each virtual phase increment register is a 32-bit register that receives a preselected phase increment value from the memory interface unit. The magnitude of the phase increment value is selected to produce a particular clock frequency that facilitates propagating data having a particular data rate to a user. This phase increment value is preferably between 1 and $2^{N-1}$. Each of the virtual phase registers operates with a corresponding virtual phase accumulator and the adder 304 to form each of the 64 virtual oscillators in the slice 302. The phase increment value storage 308 couples the phase increment value to the pipeline register 316 via signal path S19.

The phase accumulator value storage 306 may couple the accumulated phase value to a read bus 330 via signal path S20. Similarly, the phase increment value storage 308 may couple the phase increment value to the read bus 330 via signal path S21. As the read bus 330 is also coupled to the memory interface 328, the memory interface 328 may read the phase accumulator and phase increment values from the respective phase accumulator block and phase increment blocks 306 and 308. Although the operation of the rate generator 300 may not require the read bus 330, the memory interface unit 328 may read values from the read bus 330 during testing and system verification.

Each slice 302 comprises 64 of the oscillators of FIG. 1, the slice 302 includes pipeline registers 314 and 316 to pipeline or streamline the respective outputs from the phase accumulator value storage 306 and the phase increment value storage 308. Each pipeline register 314 may, illustratively, comprise a 32-bit register for receiving a phase value from any one of the 64 virtual phase accumulators represented by the phase accumulator value storage 306. This phase value is the sum of the adder 304 from a previous frequency cycle. Similarly, the pipeline register 316 may, illustratively, comprise a 32-bit register for receiving the phase increment value from any of the 64 virtual phase increment registers from the phase increment value storage 308. These pipeline registers 314 and 316 couple the adder 304 via respective signal paths S22 and S23.

The adder 304 receives the pipelined outputs from the phase accumulator value storage 306 via signal path S22 and the phase increment value storage 308 via signal path S23. At any given frequency cycle, the adder 304 sums the outputs from one of the 64 virtual phase accumulators and the output from a corresponding virtual phase increment register. The adder 304 couples the sum to the pipeline register 318 via signal path S24. As with the phase adder depicted in FIG. 1, the adder 304 is a modulo $2^N$ adder that rolls over and provides a carry out pulse, every time the sum passes over the value of $2^N-1$. The adder 304 couples the carry out pulse to a register via signal path S25, which stores and couples this pulse to one of the stack registers in the FIFO block 324 via signal path S26.

The pipeline register 318 operates in substantially the same manner as the other pipeline registers 314 and 316 at the respective outputs of the phase accumulator value storage 306 and the phase increment value storage 308. The pipeline register 318 couples the modulo $2^N$ adder output to the phase MUX 312 via signal path S15.

The FIFO block 324, which comprises 64 8-bit registers, receives the stream identifier or address from the register 322 via signal path S27 and the pulse from the register 320 via signal path S26. This pulse operates as a Write Enable (WE) to the FIFO block 324. Upon receiving the pulse associated with a particular user or stream identifier, the FIFO block 324 receives the stream identifier from the register 322. As the FIFO block 324 may receive multiple stream identifiers, the FIFO block processes the different stream identifiers in a FIFO queue arrangement. As such, the FIFO block 324 couples the stream identifiers in the order received to an output MUX 332 via signal path S28. In this manner, the stream identifiers are read into the FIFO at a rate that is defined by the frequency of each virtual oscillator.

The output MUX 332 may receive stream identifiers from each of the four slices 302. The rate generator 300 may include other control circuits to determine the particular slice output received by the output MUX 332. At any given instant, the output MUX 332 may transmit the stream identifier of one of the 256 users at an arbitrary (averaged) frequency $f_o$ that is a function of the sampling frequency, the number of accumulator bits and the pre-selected phase increment. The output MUX 332 transmits the sequence of stream identifiers via signal path S29.

The rate generator 300 may also include a request generator 334 that transmits a packet request via signal path S30 each time the output MUX 332 transmits the stream identifier for one of the users. The request, which may comprise a pulse or some other signal, generally represents a request of video content by any one of the users. The rate generator provides these requests at an output frequency that is dependent on the sampling frequency, the number of accumulator bits and an arbitrarily selected phase increment value.

In one embodiment of the invention, a dithering method is used to improve the frequency resolution of data transmitted to a user. This embodiment is well suited to a VOD system in which a current disk read or disk access is limited to extents or logical memory blocks sized as a multiple of whole packets. Specifically, in order to gain a finer frequency resolution, the VOD system needs to read and serve partial packets during each disk read. One approach is to dither the extents stored on disk or memory. In this dithering approach, the VOD system periodically marks the last packet in an extent as a "throw away" packet. The amount of dithering required depends on the desired output frequency or bit rate. The VOD system may use software for checking the last marked packet in the extent during disk read and decrementing the packet count in the extent if necessary. Alternatively, the VOD system may use hardware for checking each packet when fetched from memory and discarding the previously marked throw away packet.

Additionally, as the VOD system is an open-loop system, there is no flow control between the server 50 and end user equipment 70. This requires accurate packet request rates and corresponding data rates. This packet request rate depends on the sampling frequency of its associated oscillator 100, which depends on the clock frequency, i.e. 33 MHz in the previously example. As such, an extremely accurate clock or clock oscillator is required. Otherwise, the end user 70 may encounter data overflow or underflow (data starvation) problems.

As an example, suppose the data overflow or underflow (at the end user) is limited to 10 or fewer packets over a two-hour period. The associated frequency error is:

$$\Delta f_{packet} = \frac{10 \text{ packets}}{7200 \text{ sec}} = 0.0138 \text{ Hz (packets/sec)}$$

If the VOD system is transmitting video at a nominal bit rate of 3.375 Mbits/sec, the corresponding packet frequency is:

$$f_{pack} = \frac{3.375 \text{ Mbits/sec}}{1504 \text{ bits/packet}} = 2244 \text{ Hz (packets/sec)}$$

The corresponding relative frequency error (RFE) is:

$$RFE = \frac{\Delta f_{pack}}{f_{pack}} = \frac{0.00138 \text{ packets/sec}}{2244 \text{ packets/sec}} = 6.15 \times 10^{-7} \approx 0.6 \text{ ppm (parts per million)}$$

If the VOD system is transmitting HDTV video at a 40 Mbits/sec bit rate ($f_{pack}$=26596 packets/sec as previously determined), the associated RFE is:

$$RFE = \frac{\Delta f_{pack}}{f_{pack}} = \frac{0.0138 \text{ packets/sec}}{26596 \text{ packets/sec}} = 5.2 \times 10^{-8} \approx 0.05 \text{ ppm}$$

The current clocks or crystal oscillators have a short term stability of less than 1 ppm. The precision decreases by approximately 1 ppm each year, so clock or crystal oscillator has a long-term stability that exceeds 10 ppm after 10 years. This long-term stability (10 ppm) is 200 times worse than the required precision (0.05 ppm) at the HDTV bit rate.

In order to maintain a precise clock, the clock may comprise a high stability oven controlled crystal oscillator (COX). When the COX ages and the precision or RFE drifts to an unacceptable level, the oscillator will be replaced or recalibrated if possible. Alternately, the clock may comprise a less stable oscillator that requires routine, i.e. daily, calibration.

In one embodiment of the invention a priority queue is utilized as a rate generator for a multiple stream, multiple bit rate delivery system. A priority queue is a data structure typically used for maintaining an ordered set of elements, where each element is associated with a key. In the case of the exemplary embodiment, the elements are unique stream identifiers and the keys are deadlines for the next packet(s) to be delivered via the associated stream. The priority queue may be implemented as a heap and, using a heap sort algorithm, provides an extremely efficient means for inserting a new node into an already sorted queue. The new node represents an additional bitstream to be transmitted to a user or subscriber.

Figure 5:
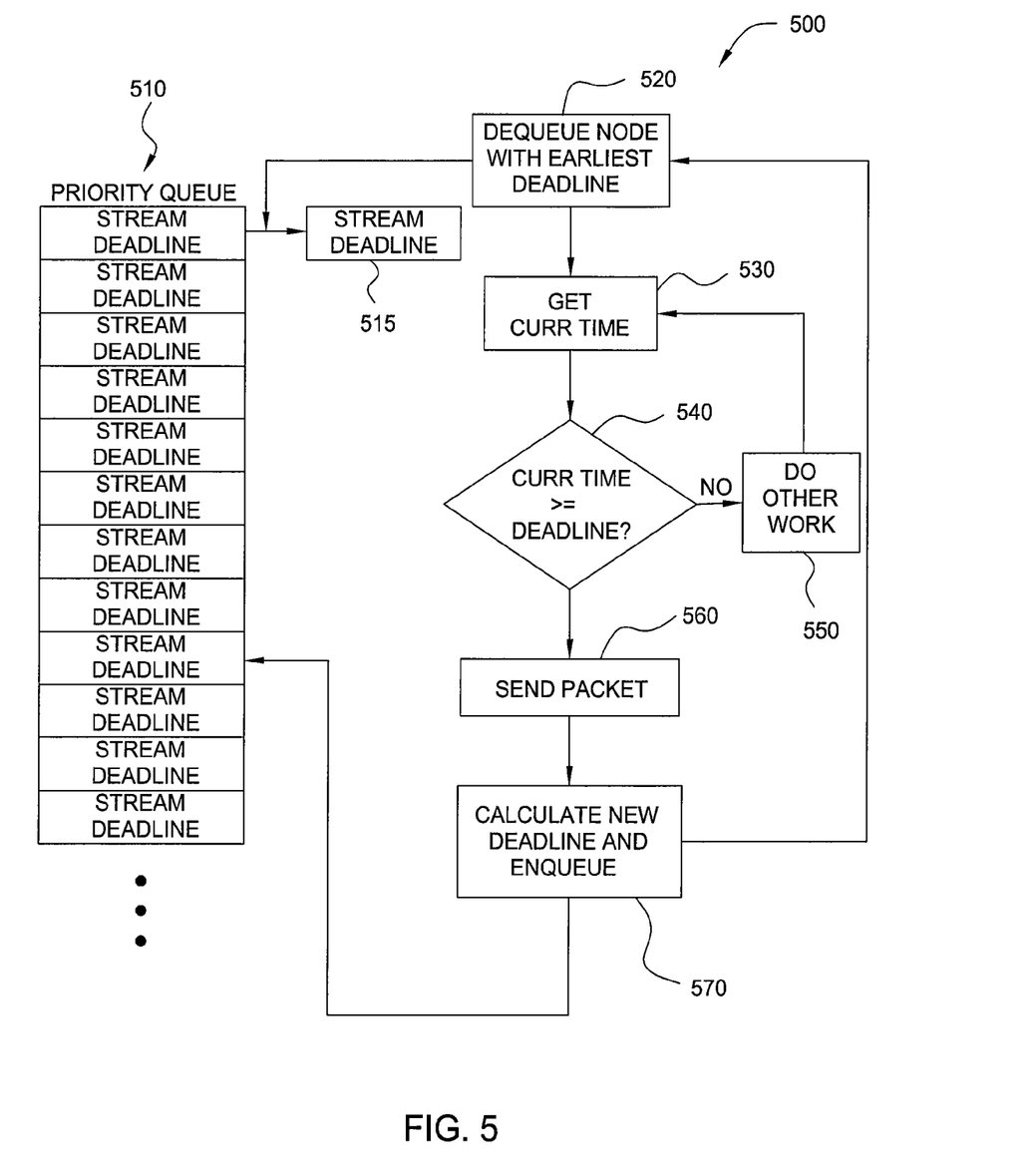
FIG. 5 depicts a combination flow diagram a relational diagram useful in understanding an embodiment of the present invention.

FIG. 5 depicts a combination flow diagram a relational diagram useful in understanding an embodiment of the present invention. Specifically, FIG. 5 depicts a method 500 in which an exemplary priority queue 510 including therein a plurality of "stream deadline" elements which represent stream deadline keys for various bitstreams to be provided to subscribers is processed. It is noted that each deadline key has associated with it a unique stream identifier which identifies the particular bitstream corresponding to the respective deadline. The invention associates content portions (e.g., one or more video and/or audio packets of a program stream) with a streaming deadline such that a processor or controller forming or processing the priority queue including the content portions may be enabled to perform other functions when not streaming or transmitting.

At step 515, the stream deadline of the element at the top of the priority queue 510 is examined. At step 540, a determination is made as to whether a current time is greater than or equal to the stream deadline time examined at functional element 515. If the query at step 540 is answered negatively, then at step 550 the controller (or processing element or system) optionally performs other work or functions, and the method 500 proceeds to step 530 where the current time is retrieved. If the query at step 540 is answered affirmatively, then at step 560 the packet or packets associated with the "top of queue" stream deadline element deadline are transmitted to the appropriate recipient, subscriber or user.

At step 570, a new deadline and enqueue is calculated and, if necessary, packets associated with the new deadline and enqueue are inserted into an appropriate position with the priority queue 510. After determining a new deadline and enqueue, at step 520 the dequeue node having the earliest deadline is cause to be examined in the manner of step 510. After causing the dequeue node with earliest deadline to be examined, at step 530 the current time is determined, and at step 540 the current time is compared to the deadline time of the dequeued node, as discussed above.

The operations discussed above with respect to FIG. 5 result in a preferably software routine that effectively operates as a rate generator for a multiple stream, multiple bit rate delivery system. That is, those bitstreams having a higher bit rate such that more data must be transmitted are processed more frequently by the FIG. 5 methodology. Those bitstreams having a lower bit rate or otherwise requiring less processing are processed less frequency by the FIG. 5 methodology. By operating in this manner, a video on demand server or other information distribution source is capable of providing a plurality of bitstreams, such as MPEG-2 audio visual compressed information streams, to one or more subscriber in an orderly manner and at different bit rates if necessary.

The priority queue rate generator scheme discussed above may be used in conjunction with other rate processing schemes, such as the above-described rate generator suitable for use in a video on demand system having multiple constant bit rate data. The above description references other processing techniques suitable for use within the context of a video on demand server or, more generally, an information server. It is contemplated by the inventors that the above-described priority queue rate generator scheme is applicable to all of the rate generation techniques. Specifically, the present priority queue rate generator scheme has brought applicability to any system requiring the management of multiple streams, especially those systems requiring multiple streams having different bit rates.

In another embodiment, a priority queue is structured such that, at any given moment, the top of the priority queue indicates the stream with the most urgent packet deadline. As previously noted, the packet deadline is indicated by the key associated with the priority queue. Each element is "popped" off the priority queue in turn according to the respective priority of the element (i.e., highest priority first), and the information distribution system (e.g., a VOD server) waits until the deadline associated with a particular element expires. This results in the delivery of that stream's packet. Waiting for the expiration of element deadlines, the system may perform other useful or ancillary functions such as the known sleep, or other functions. After a packet is delivered for a particular stream, a new deadline is calculated based upon the encoded bit rate of the new stream and a new entry is inserted into the priority queue based upon the relative priority or urgency associated with the packet for the new stream.

Although various embodiments which incorporate the teaching of the invention have been shown and described in detail herein, those skilled in the art can readily devise many other varied embodiments that still incorporate these teachings.

What is claimed is:

1. A method of processing data streams, comprising:

receiving a plurality of data streams having a plurality of bit rates and comprising packets of data, each of the plurality of data streams comprising only a constant bit rate;

determining a bit rate associated with each packet of data of the plurality of data streams;

providing a priority queue including a plurality of queues in memory for queuing the received plurality of data streams, each queue in the priority queue being associated with a single data stream, each of the queues in the priority queue having a stream deadline element associated therewith, wherein each stream deadline element has a stream identifier for identifying a data stream in the queue corresponding to the stream deadline element and a deadline key for identifying a deadline based on the determined bit rate associated with packets of the identified data stream for forwarding packets associated with the steam deadline element;

arranging in priority order the queues in the priority queue holding content streams from a highest priority queue to a lowest priority queue based on the deadline keys in each of the plurality of queues;

retrieving, from the highest priority queue in the priority queue, a stream deadline element including a respective stream deadline key and a stream identifier identifying the data stream associated with highest priority queue;

examining a deadline identified by the deadline key from the retrieved stream deadline element of the highest priority queue to determine whether the deadline associated with the highest priority queue has expired; and transmitting at least one packet in the highest priority queue associated with the data stream identified by the stream identifier only when the deadline has expired;

wherein data streams having a relatively low bit rate according to the deadline identified by the deadline keys are processed less frequently than data streams having a relatively high bit rate according to the deadline identified by the deadline keys and wherein the examining the deadline identified by the deadline key from the retrieved stream deadline element of the highest priority queue enables the plurality of data streams to be transmitted at different rates based on the bit rate of each data stream.

2. The method of claim 1 further comprising enabling a processing element to perform an alternate task when the deadline has not expired.

3. The method of claim 2, wherein said alternate task is exited when the deadline has expired.

4. The method of claim 1, further comprising:

calculating, after transmitting said at least one packet, a new deadline of at least one next packet associated with said identified data stream; and inserting, into said priority queue, a new stream deadline element for said identified data stream including a respective stream deadline key using said new calculated deadline.

5. The method of claim 4, wherein said new deadline is calculated using the determined bit rate of the identified data stream and said stream deadline element is inserted into the priority queue based upon the relative priority of the at least one next packet.

6. The method of claim 1, further comprising:

calculating, for at least one packet of a new data stream to be transmitted, a deadline associated with said new data stream; and inserting, into said priority queue, a new stream deadline element for said new stream including a respective stream deadline key using said new calculated deadline.

7. The method of claim 1, wherein said stream deadline elements operate to provide a rate generator function within a multiple stream delivery system.

8. The method of claim 7, wherein said multiple stream delivery system also comprises a multiple bit rate delivery system.

9. The method of claim 1, wherein a priority indicative position of a stream deadline element within said priority queue is adapted in response to changes in the respective deadline key of the stream deadline element.

10. The method of claim 1, wherein said stream deadline elements operate to provide a rate generator function within a multiple stream, multiple bit rate delivery system.

11. A method of regulating the delivery time of content, comprising:

receiving a plurality of content streams having a plurality of bit rates and comprising packets of data, each of the plurality of data streams comprising only a constant bit rate;

determining a bit rate associated with each packet of data of the plurality of data streams;

providing a priority queue including a plurality of queues in memory for queuing the received plurality of data streams, each queue in the priority queue being associated with a single data stream, each of the queues in the priority queue having a stream deadline element associated therewith, wherein each stream deadline element has a stream identifier for identifying a data stream in the queue corresponding to the stream deadline element and a deadline key for identifying a deadline based on the determined bit rate associated with packets of the identified data stream for forwarding packets associated with the steam deadline element;

arranging in priority order the queues in the priority queue holding content streams from a highest priority queue to a lowest priority queue based on the deadline keys in each of the plurality of queues;

retrieving, from the highest priority queue in the priority queue, a stream deadline element including a respective stream deadline key and a stream identifier identifying the data stream associated with highest priority queue;

examining a deadline identified by the deadline key from the retrieved stream deadline element of the highest priority queue to determine whether the deadline associated with the highest priority queue has expired;

when the deadline has not expired, performing tasks other than transmitting packets;

when the deadline has expired, performing the steps of:

transmitting at least one packet in the highest priority queue associated with the data stream identified by the stream identifier;

calculating, after transmitting at least one packet in the highest priority queue associated with the data stream identified by the stream identifier, a new deadline of at least one next packet associated with an identified content stream including said transmitted packet, wherein said new deadline is calculated using the determined bit rate of said identified content stream;

inserting, into said priority queue, a new stream deadline element for said identified content stream including a respective stream deadline key using said new calculated deadline; and inserting said at least one next packet into the priority queue according to its relative streaming deadline, said at least one next packet comprising a next portion of said identified content stream including said transmitted packet;

wherein examining the deadline identified by the deadline key from the retrieved stream deadline element of the highest priority queue enables the plurality of content streams to be transmitted at different rates based on the bit rate of each content stream.

12. The method of claim 11, further comprising:

inserting a new stream packet into the priority queue according to its relative streaming deadline, said new stream packet comprising a packet of a new content stream to be transmitted.

13. The method of claim 12, further comprising:

calculating, using the determined bit rate of said new content stream, a new streaming deadline of said new stream packet using the determined bit rate of said new content stream.

* * * * *

UNITED STATES PATENT AND TRADEMARK OFFICE
CERTIFICATE OF CORRECTION

| | |
|---|---|
| PATENT NO. | : 7,904,931 B2 |
| APPLICATION NO. | : 10/238398 |
| DATED | : March 8, 2011 |
| INVENTOR(S) | : Frederickson et al. |

It is certified that error appears in the above-identified patent and that said Letters Patent is hereby corrected as shown below:

Col. 14, line 40, claim 11: "the steam deadline element;" should read --the stream deadline element;--

Signed and Sealed this
Twenty-fifth Day of October, 2011

David J. Kappos
*Director of the United States Patent and Trademark Office*